Dec. 17, 1957

E. THUERMEL ET AL 2,817,048

TRANSISTOR ARRANGEMENT

Filed Dec. 13, 1955

Inventors:
Eberhard Thuermel
Karl Siebertz
Heinz Henker
Dieter Enderlein

By [signature] Atty.

United States Patent Office 2,817,048

Patented Dec. 17, 1957

2,817,048

TRANSISTOR ARRANGEMENT

Eberhard Thuermel, Karl Siebertz, Heinz Henker, and Dieter Enderlein, Munich, Germany, assignors to Siemens & Halske Aktiengesellschaft, Munich and Berlin, Germany, a corporation of Germany Application December 13, 1955, Serial No. 552,922

Claims priority, application Germany December 16, 1954

14 Claims. (Cl. 317—234)

The present invention relates to directional conductors, transistors and the like, and is particularly concerned with an arrangement comprising a casing containing, for example, a transistor having at least one electrode connected therewith in good heat conducting manner through the medium of an insulating layer, said transistor being disposed in heat conducting connection upon a carrier body adapted to absorb heat, and an insulating layer disposed outside of the casing and structurally connected therewith in such a manner that it serves as a dielectric of a capacitor one coating of which is formed by the casing while the other coating is formed by a metallic member which may be mounted upon said body.

The various objects and features of the invention will be brought out in the course of the description which is rendered below with reference to the accompanying drawings in which.

It is known (see Proc. I. R. E. April 1954, page 1248) to solder the collector of a junction transistor in good heat conducting manner upon a mass or body which is in good heat conducting relationship directly connected with the casing or part of the casing so as to obtain a higher loadability of the collector. The casing is in such structure provided with a threaded part for attachment to a desired body and an insulating member is disposed between the collector and the body in order to avoid grounding the collector.

Figure 1:
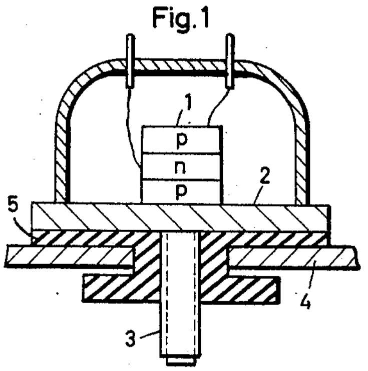
Figs. 1 and 2 show examples of known arrangements.

Referring now to Fig. 1 numeral 1 indicates a p-n-p junction transistor comprising a collector which is soldered to a metallic plate 2 forming part of a casing. The leads to the base and to the emitter are conducted through the casing in insulating manner. The metallic plate 2 may be secured to a body 4 by means of a threaded part 3 which provides for transfer of the heat developed in operation. An insulating plate 5 is disposed between the plate 2 and the carrier body or mass 4 and between the threaded part and the nut and the plate 2, respectively, so as to insulate the collector against the carrier 4. The drawback of this arrangement is that the collector capacitance depends upon the thickness of the material and the condition of the disklike member 5.

Figure 2:
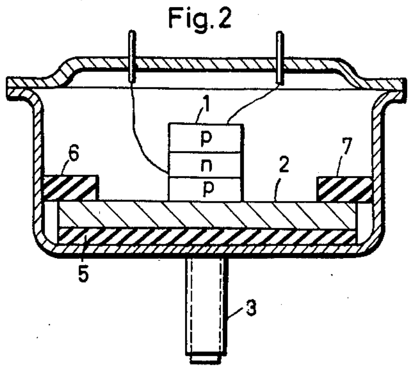

Another known arrangement is indicated in Fig. 2 in which identical parts are referenced as in Fig. 1. The insulating layer 5 is disposed inside of the casing between the mass 2 and the casing bottom. The drawback is that special means must be provided for pressing the plate 2 firmly against the bottom of the casing so as to obtain good heat transfer. There are provided for this purpose resilient insulating blocks 6 and 7 which may for example be made of rubber. The assembly is considerably more cumbersome than that of Fig. 1 and the elements inside the casing which are in part rubberlike or of artificial materials present the danger of chemical contamination of the semi-conductor surface by liberation of substances from organic matter.

The invention avoids these drawbacks by utilizing the insulating layer which is structurally connected with the casing as the dielectric of a capacitor, one coating of which is formed by the casing and the other coating of which is formed by a metallic part which is attachable to the supporting mass or carrier body. Examples of the invention will be explained with reference to Figs. 3 to 5.

Figures 3, 4, 5:
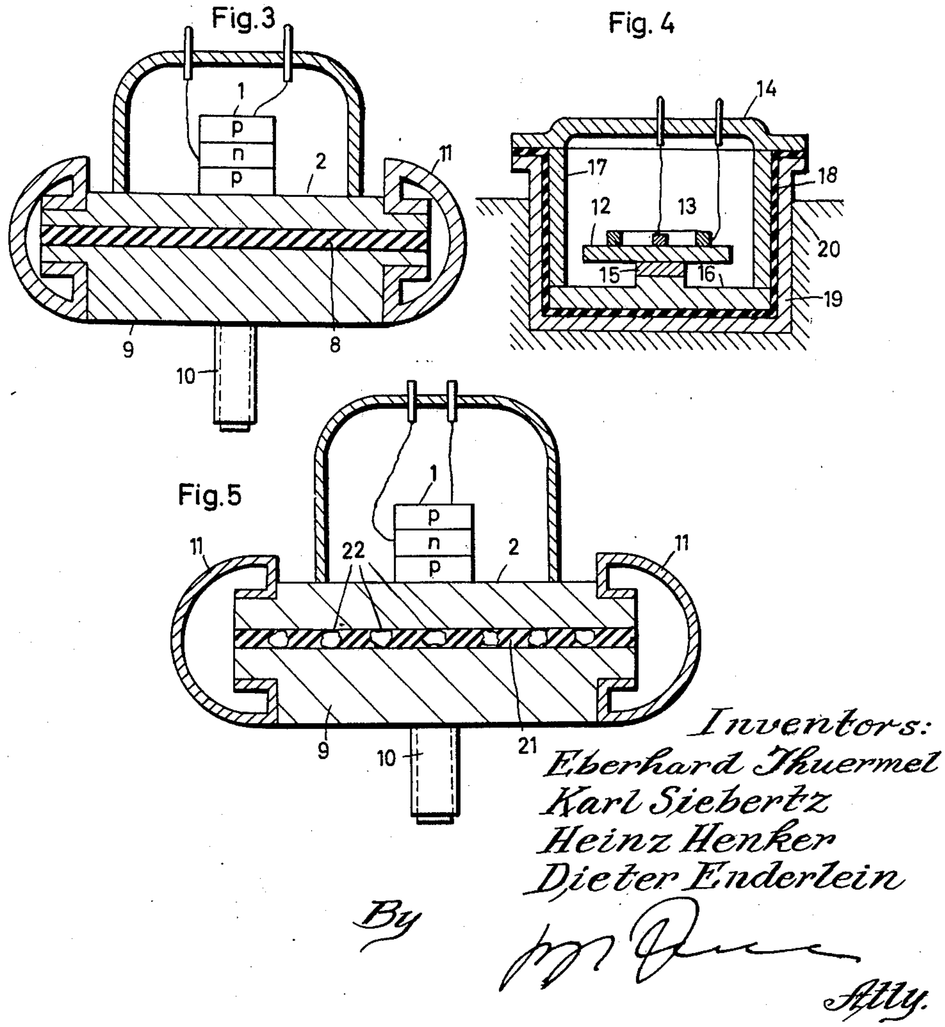
Figs. 3 to 5 show examples of arrangements according to the invention.

Fig. 3 shows a p-n-p semi-conductor made of silicon or germanium crystal. The lower electrode is soldered to a plate 2 similar as in the known arrangement shown in Fig. 1. Upon the plate 2 which forms part of the casing there is in accordance with the invention provided an insulating layer 8 and upon the latter is provided a metallic plate 9 carrying a threaded part 10. The two plates 2 and 9 form the two coatings of a capacitor whose capacitance is formed by the insulating layer 8, such layer forming a structural unit with the transistor arrangement. The two plates 2 and 9 are held together by an annular insulating holder 11 which is peened over or screw connected or secured in different suitable equivalent manner.

The plates 2 and 9 may be cemented to the insulated layer 8 and the holder 11 may in such case be omitted. The insulating layer may be made of a cementitious material, varnish and the like. It may be in some circumstances suitable to make the holder 11 detachable and to make the insulating layer 8 removable so as to make it possible to combine with the assembled transistor selectively capacitors of different capacitance.

Fig. 4 shows as an example another embodiment of the invention. Numeral 12 indicates a germanium plate carrying alloyed thereto an indium electrode on each side thereof. The lead to the emitter 13 is carried through the casing member 14 in insulated manner. The collector 15 is soldered to a metallic plate 16 forming the lower closure for the cylindrical casing part 17, numeral 16 indicating a bottom casing member 16 which is surrounded by insulating material 18 contained in a potlike metallic member 19. The casing thus forms with the member 19 a capacitor which may be inserted in a cylindrical opening of a carrier body 20, thereby providing for an extremely favourable heat transfer between the carrier 20 and the casing 17. The parts 18 and 19 may be jacked onto the casing part 17 and the part 18 may in such case be made of at least two separate members if desired.

In accordance with the example shown in Fig. 5, the insulating dielectric 21 is made of an artificial material, for example, a synthetic resin which may be hardened or plastic and containing embedded therein powdered quartz or ceramic particles 22 of uniform size. The size of the individual quartz particles corresponds in such case substantially to the spacing between the two coatings. The insulating layer is arranged so that there is always only one layer of quartz particles between the opposite coatings.

The advantage of this construction of the dielectric is that it provides particularly good heat conductivity and at the same time a well defined spacing between the coatings. The insulating layer 21 may be particularly made of an artificial insulating material, for example, of material known under the name Araldit, in which are embedded quartz bodies 22 of substantially identical size in such a manner that they form a single layer defining clearly the spacing between the layers 2 and 9. In the case of a transistor for 1½ to 2 watts, the particle size of the quartz bodies may be approximately $20\mu$. It is, however, also possible to use for the spacing layer particles up to $100\mu$ and to fill the intervening spaces with smaller particles of about $5\mu$.

It is in accordance with the further feature of the invention possible to increase the conductivity considerably by using for the insulating body a material of particular heat constancy, of the kind of a thermoplastic material, for example, vinylcarbazol. Other artificial materials that may be employed, include, for example, monostyrol and polystyrol containing hardeners, also polyetheracetate and unsaturated polyester resins, especially substances obtainable in trade under the name Leguval. Thermoplastic materials such as polyethylene and fluorocarbon, for example, polychloridetrifluorethylene may be correspondingly used.

The insulating material may be produced, for example, by providing a layer of monocarbazol containing insulating bodies, the layer hardening in known manner more or less to form polycarbazol, or it may be prepared initially thermoplastically as a polymer product. The substance has the advantage that it remains unaltered even with strong heating of the casing in or on which it may be disposed and that it is particularly moistureproof. It has been found, particularly in the case of Araldit, that such material cracks in the presence of temperatures produced for example by the soldering of leads during assembly operations, acting as a result as a heat choke. There is in addition the danger that moisture enters such cracks and impairs the electrical insulation. A substance such as vinylcarbazol gives furthermore the advantage of particularly high adhesion relative to the surfaces to be connected together and also good wetting of the embedded heat conducting bodies as well as a very uniform homogeneous formation of the entire layer. These conditions favour the electrical insulation and the heat conductivity of the dielectric made in accordance with the invention.

It is within the scope of the invention to provide for the intended artificial substances further additions, especially a softener which affects the artificial substance so that it remains to a certain degree plastic. The invention contemplates moreover to use as good heat conducting insulating bodies oxide insulators, especially quartz or preferably aluminium oxide and/or magnesium oxide. Highly pure and therefore high ohmic silicon carbide may be used with advantage as a good heat conductor in the case of low voltages and low requirements so far as insulation is concerned.

In accordance with another feature of the invention, substances such as described may also be advantageously employed in connection with other electrical devices in which various preferably metallic parts made for example of iron are to be connected together in electrically insulating and at the same time heat conducting manner. They may for example be provided inside the casings of transistor arrangements in which the collector and/or emitter and/or base are to be connected in good heat conducting manner with the casing. The dielectric according to the invention may if desired fill the inside of the casing in whole or in part. The unsaturated polyester resins mentioned before are suitable for this purpose. Another possibility of use resides in a thermistor comprising a heat responsive body made in flat, for example, disk-shaped form, which is to be provided directly upon a metallic member but wherein the heat responsive member is to be electrically insulated against the carrier body. The dielectric according to the invention may in such case be disposed between the heat responsive body and a well heat conducting member, for example, copper, which may be carried upon a body to be controlled or to be examined with respect to its temperature.

In accordance with the further object and feature of the invention, a heat contact of high electrical insulating quality which is in the highest degree satisfactory is obtained by an insulator formed as a monocrystal whose basic substance exhibits such a high purity as has been aimed at and reached only with semi-conductor substances, that is, substances containing at the most contaminations on the order of $10^{-4}$ to $10^{-6}$ or even $10^{-8}$.

All materials with great band width may in such cases be used as insulators, especially oxide insulators and high ohmic and particularly self-conducting semi-conductors, for example, quartz or better yet aluminium oxide or magnesium oxide.

The production of monocrystal forms as well as the necessary degree of purity which affects the heat conductivity is carried out according to methods developed for the purification and monocrystal fabrication from semi-conductor substances. The purification and/or monocrystal production may especially be accomplished in accordance with the zone melting process, for example, with vertical disposition of rod-shaped materials without the use of crucibles. The monocrystal may however also be produced without the use of a crucible by drawing from a melt highly pure material or by fusing together powdered materials.

In accordance with still another object and feature of the invention, the monocrystals which are preferably made in the form of thin layers, are coated with a well heat conducting cement or preferably with a metal film, for example, by vaporisation, spraying or electrochemically and the like so that they may be soldered together with metal parts in heat transfer contact therewith.

In the event that the material used should form an anisotropic crystal, cutting of such crystal is provided for in such a manner that it has its highest heat conductivity in the direction of heat transfer.

The term "transistor" is intended to include directional conductors and similar structures.

Changes may be made within the scope and spirit of the appended claims in which is defined what is believed to be new and desired to be protected by Letters Patent.

We claim:

1. A transistor arrangement comprising a casing, at least one electrode in good heat conducting connection with at least part of said casing, a carrier for said transistor serving to receive developed heat, an insulating layer interposed between said transistor and said casing, means for connecting said insulating layer with said casing, said insulating layer forming the dielectric of a capacitor, said casing forming one coating of said capacitor, and a metallic part attachable to said carrier forming the other coating therefor.

2. A structure and cooperation of parts according to claim 1, wherein said insulating layer is removable.

3. A structure and cooperation of parts according to claim 1, wherein said insulating layer is cemented together with at least one of said coatings.

4. A structure and cooperation of parts according to claim 1, wherein said layer is made at least in part of cementitious material.

5. A structure and cooperation of parts according to claim 1, comprising holder means for said metallic part and said insulating layer.

6. A structure and cooperation of parts according to claim 1, comprising an insulating layer made of artificial material containing solid insulating good heat conducting insulating matter embedded therein.

7. A structure and cooperation of parts according to claim 6, comprising particles of substantially identical size constituting said matter and arranged in a single layer.

8. A structure and cooperation of parts according to claim 1, comprising an insulating layer made of synthetic thermoplastic material containing granular solid heat conducting insulating matter embedded therein.

9. A structure and cooperation of parts according to claim 8, wherein said granular insulating matter is selected from the class of materials consisting of aluminum oxide and magnesium oxide and silicon carbide.

10. A structure and cooperation of parts according to claim 8, comprising a thermistor in engagement with said insulating layer.

11. A structure and cooperation of parts according to claim 1, comprising an insulating layer made of a single crystal simiconductor material.

12. A structure and cooperation of parts according to claim 1, comprising an insulating layer made of a single crystal semiconductor material exhibiting at the most $10^{-4}$ to $10^{-8}$ contamination affecting heat conductivity.

13. A structure and cooperation of parts according to claim 12, wherein said crystal has anisotropic structure exhibiting greatest heat conductivity in the direction of heat transfer.

14. A structure and cooperation of parts according to claim 11, comprising a metallic film carried at least upon one side of said crystal in firmly adhering engagement therewith.

References Cited in the file of this patent

UNITED STATES PATENTS

| | | |
|---|---|---|
| 2,712,620 | Marlet | July 5, 1955 |
| 2,730,663 | Harty | Jan. 10, 1956 |
| 2,738,452 | Martin | Mar. 13, 1956 |

FOREIGN PATENTS

| | | |
|---|---|---|
| 678,693 | Germany | July 19, 1939 |
| 584,672 | Great Britain | Jan. 21, 1947 |